United States Patent Office 3,324,063
Patented June 6, 1967

3,324,063
MIXTURE OF TWO ANIONIC POLYMERIC DISPERSING AGENTS ONE OF WHICH CONTAINS A CARBOXYL GROUP
Arthur S. Teot, Midland, Mich., assignor to The Dow Chemical Company, Midland, Mich., a corporation of Delaware
No Drawing. Filed June 3, 1963, Ser. No. 284,815
7 Claims. (Cl. 260—29.6)

This invention concerns synergistic mixtures of anionic polymers useful as dispersing agents for dispersing pigments and other water-insoluble particulate solids in aqueous media.

The use of certain anionic, low molecular weight polymers of the sulfonated naphthalene and the polyacrylic acid types as dispersing agents is well known.

It has now been discovered that a mixture of alkali metal salts of resinous polymeric sulfonic acids or a mixture of resinous polymeric carboxylic acids or a mixture of both resinous polymeric sulfonic acids and resinous polymeric carboxylic acids surprisingly gives a synergistic effect when used as a dispersing agent to disperse water-insoluble colorants (whether pigments or dyes), extenders, and fillers.

The resinous polymeric sulfonic acids useful in the mixtures of this invention are those having a relatively low molecular weight, advantageously ranging between $1 \times 10^3$ and $2 \times 10^5$, and a hydrocarbonyl backbone which has been sulfonated to an extent sufficient to render them water-soluble in the free acid or alkali metal salt form. Advantageously, they are derived from polymeric alkenyl-aromatic hydrocarbons and copolymers thereof with those olefinic monomers which are copolymerizable with styrene by sulfonation to the extent of about one sulfonic group per available aromatic nucleus. They are used as their alkali metal salts. Representative of such well-known sulfonate polymers are the polymeric styrene, polymeric vinyl-toluene, and polymeric naphthalene sulfonates, both homopolymeric and copolymeric.

The resinous polymeric carboxylic acids useful in the mixtures of this invention are those having a relatively low molecular weight, advantageously between about $1 \times 10^3$ and $2 \times 10^5$, and a hydrocarbonyl backbone to which carboxylate groups are attached in an amount sufficient to render the polymers water-soluble in the alkali metal salt form. Advantageously, they are alkenylalkyl and alkylene oxazolidinone-, alkylene oxazinidinone- and alkylene oxazepidinone-carboxylic acid homopolymers and copolymers with styrene and ethylenic unsaturated monomers which are copolymerizable with styrene. They are used as their alkali metal salts. Representative of such well-known polymeric carboxylic acids are polyacrylic acid; polymethacrylic acid; styrene-itaconic acid copolymers; N-vinyl-2-oxazolidinone-maleic anhydride copolymers, and N-vinyl-2-oxazepidinone-maleic anhydride copolymers, N-vinyl-2-oxayinidinone-maleic anhydride copolymers, and N-vinyl-2-oxayepidinone-maleic anhydride copolymers; hydrolyzed acrylonitrile copolymers; crotonic acid copolymers, etc. By "water-soluble" is meant an anionic polymer of the type set forth above which is soluble to the extent of at least 5 weight percent in water to give a visually continuous solution.

In practice, the synergistic combinations of mixtures of either or both sulfonate and carboxylate anionic polymers are used in weight proportions ranging between 1:9 to 9:1, advantageously as a 10 to 50 weight percent aqueous solution. Such solutions are particularly useful in dispersing aqueous slurries of particulate water-insoluble colorants, extenders and fillers in aqueous vehicles. For such purposes, 0.02 to 5 weight percent of mixed sulfonate and carboxylate polymers, particulate solid basis, is used.

The following examples describe completely representative specific embodiments and the best mode contemplated by the inventor of carrying out the invention. They are not to be taken as limitative of the invention other than as claimed. Viscosities as reported in the examples were determined with a Stormer viscosimeter.

EXAMPLE 1

*Cadmium sulfide pigment: vinyloxazolidinone-maleic anhydride half sodium salt—polyacrylic acid dispersant mixture*

A mixture was prepared of 3 weight parts of a resinous copolymer prepared by a solution process from equimolar proportions of vinyloxazolidinone and maleic anhydride hydrolyzed to the half sodium salt and 2 weight parts of Tamol 731, a polyacrylic acid sodium salt in the form of a 27.5 weight percent aqueous solution. A 44 percent by weight aqueous slurry of cadmium sulfide was made and its viscosity was measured and found to be 134 centipoises, hereafter cps. An amount of the previously prepared mixed dispersant solution sufficient to give 0.1 weight percent active dispersant, pigment basis, was added with stirring and the viscosity was again measured and found to be only 23 cps., a difference in viscosity of 111 cps. Similar experiments employing 0.1 percent resinous vinyloxazolidinone-maleic anhydride half sodium salt alone gave a viscosity of 48 cps., while that employing 0.1 percent of Tamol 731 alone gave a viscosity of 46 cps. These data show a true and unobvious synergism for the anionic polymer combination.

EXAMPLE 2

To a 42 percent $CaCO_3$ aqueous slurry was added with mixing a dispersant mixture composed of an 0.8:1 poly(sodium styrenesulfonate), prepared by a solution process and having a molecular weight of about 18,000, and Tamol 731. The total concentration of dispersant mixture added to the pigment slurry was 0.2 weight percent. The difference in viscosity between the treated, 53 cps., and initial slurry, 135 cps., was a drop of 82 cps. The poly(sodium styrenesulfonate) alone under the same conditions gave a 60 cps. viscosity drop, while the Tamol 731 alone gave a 66 cps. drop.

EXAMPLE 3

The dispersant mixture in this case was a 13.5 weight percent aqueous solution of a 1:3 mixture of sodium styrene-itaconic acid copolymer, prepared by a solution process from a 60 percent styrene, 40 percent itaconic acid mixture, and Tamol 731. The pigment slurry contained 42 percent calcium carbonate. Using the same procedure to measure the viscosity as before, a 0.15 percent concentration of dispersant, pigment basis, gave a 33 cps. viscosity difference (as compared with the system without any dispersant) for the styrene-itaconic acid copolymer alone, a 45 cps. viscosity difference for the Tamol 731 alone, and a 50 cps. difference for the mixture. This again shows a true synergism for the anionic polymer combination.

EXAMPLE 4

An aqueous slurry of 44 weight percent cadmium sulfide pigment mixture with a 19 percent aqueous dispersant mixture containing 0.8 part of poly(sodium styrenesulfonate) and one part Tamol 731 was also made. Utilizing the viscosity reduction technique, it was found that 0.3 percent dispersant, based on pigment weight, of poly(sodium styrenesulfonate) alone, gave an 89 cps. viscosity reduction, Tamol 731 alone gave a 109 cps. reduction while the just-described mixture gave a 122 cps. reduction.

What is claimed is:

1. A water-soluble mixture of from 1:9 to 9:1 weight parts of (1) poly(alkali metal styrenesulfonate) and (2) polyacrylic acid alkali metal salt, said polymers having a molecular weight ranging between $1 \times 10^3$ and $2 \times 10^5$, said composition being useful in reducing the viscosity of aqueous dispersions of particulate water-insoluble solids.

2. A water-soluble mixture of from 1:9 to 9:1 weight parts of (1) the half sodium salt of a resinous N-vinyl-2-oxazolidinone-maleic anhydride copolymer and (2) polyacrylic acid sodium salt, said polymers having a molecular weight ranging between $1 \times 10^3$ and $2 \times 10^5$.

3. A water-soluble mixture of from 1:9 to 9:1 weight parts of (1) the sodium salt of a styrene-itaconic acid copolymer and (2) polyacrylic acid sodium salt, said polymers having a molecular weight ranging between $1 \times 10^3$ and $2 \times 10^5$.

4. An aqueous solution containing from 10 to 50 weight percent of a mixture as claimed in claim 2.

5. An aqueous solution containing from 10 to 50 weight percent of a mixture as claimed in claim 1.

6. An aqueous solution containing from 10 to 50 weight percent of a mixture as claimed in claim 3.

7. A method for improving the dispersion of an aqueous dispersion of a particulate water-insoluble solid by mixing therewith from 0.02 to 5 weight percent, particulate solid basis, of a physical admixture of (1) poly(alkali metal styrenesulfonate) and (2) polyacrylic acid alkali metal salt in proportions of from 1:9 to 9:1 weight parts, said polymers having a molecular weight ranging between $1 \times 10^3$ and $2 \times 10^5$, whereby the viscosity of said aqueous dispersion is reduced.

References Cited

UNITED STATES PATENTS

| | | | |
|---|---|---|---|
| 1,976,679 | 10/1934 | Fikentscher et al. | 260—29.6 |
| 2,612,485 | 9/1952 | Baer et al. | 260—29.6 |
| 3,002,940 | 10/1961 | Holloway | 260—29.6 |
| 3,026,281 | 3/1962 | Harren | 260—29.6 |
| 3,170,888 | 2/1965 | Kutik | 260—29.6 |
| 3,223,663 | 12/1965 | Altobelli | 260—29.6 |

OTHER REFERENCES

C. Gabriel et al., Journal of Polymer Science, vol. 59, p. 425 (1962).

C. Gabriel et al., Am. Chem. Soc. Div. of Polymer Chemistry, Preprint 1, #2 pp. 213–218 (1960).

MURRAY TILLMAN, *Primary Examiner.*

P. LIEBERMAN, *Assistant Examiner.*